United States Patent [19]

Hishiki et al.

[11] Patent Number: 4,611,152
[45] Date of Patent: Sep. 9, 1986

[54] HIGH DC VOLTAGE GENERATOR

[75] Inventors: Hideo Hishiki; Yukio Kamiyama, both of Iwai, Japan

[73] Assignee: Victor Company of Japan, Limited, Yokohama, Japan

[21] Appl. No.: 591,748

[22] Filed: Mar. 21, 1984

[30] Foreign Application Priority Data

Mar. 22, 1983 [JP] Japan ................................. 58-47575

[51] Int. Cl.⁴ .......................... H01J 29/70; H04N 5/63
[52] U.S. Cl. ...................................... 315/411; 363/61; 358/190
[58] Field of Search ........................ 315/411; 358/190; 363/60, 61

[56] References Cited

U.S. PATENT DOCUMENTS

| 3,828,239 | 8/1974 | Nagai et al. | 315/411 |
| 3,846,666 | 11/1974 | Suzuki et al. | 315/411 |
| 4,051,514 | 9/1977 | Suzuki et al. | 315/411 |
| 4,109,306 | 8/1978 | Mason | 363/61 |
| 4,437,147 | 3/1984 | Takamura et al. | 363/61 |

FOREIGN PATENT DOCUMENTS

| 0025266 | 2/1977 | Japan | 363/61 |
| 1302342 | 1/1973 | United Kingdom . | |
| 2100075 | 12/1982 | United Kingdom . | |

Primary Examiner—Theodore M. Blum
Assistant Examiner—David Cain
Attorney, Agent, or Firm—Pollock, VandeSande & Priddy

[57] ABSTRACT

The primary winding of a stepup transformer is energized by a time-varying current for inducing a high voltage pulse in the secondary winding of the transformer in response to a rapid change in the time-varying current. A plurality of first diodes and a plurality of capacitors are arranged to form a voltage multiplier for multiplying the amplitude of the high voltage pulse and storing the multiplied pulse on the capacitors to develop a high DC voltage. A second diode is connected in a circuit between one end of the secondary winding and ground so that a current may flow in a loop through the first and second diodes in response to the high voltage pulse and potentials of opposite polarities may develop across the secondary winding. The second diode provides a capacitance in series with the distributed capacitance of the secondary winding, thus reducing the total capacitance to permit ringing to occur at a desired harmonic frequency of the high voltage pulse.

20 Claims, 17 Drawing Figures

HIGH DC VOLTAGE GENERATOR

BACKGROUND OF THE INVENTION

The present invention relates to a high DC voltage generator which is particularly useful in television receivers for generating a high DC voltage that drives the intensifier electrode of the cathode ray tube.

The cathode ray tube of a television receiver requires a high DC voltage for its intensifier electrode and this high voltage is derived from a flyback circuit that utilizes the horizontal sweep current of the receiver. The flyback circuit includes a flyback transformer of which the primary winding is connected to the horizontal sweep generator and the secondary winding is connected to a voltage multiplier. In response to a rapid change in sweep current, a high voltage flyback pulse is induced in the secondary winding and multiplied in amplitude and stored on capacitors of the voltage multiplier to generate a high DC output voltage.

To meet the increasing demands for high quality color television receivers, it is necessary to minimize the amount of ringing current of the flyback circuit which is generated by the resonance of a current in the secondary winding to the frequency determined by the leakage inductance and distributed capacitance of the flyback transformer. It is desirable that the resonance occurs at the frequency of one of the ninth, thirteenth and seventeenth harmonics of the flyback pulse, or horizontal sweep current to minimize the ringing current. Another undesirable factor is the voltage output variation which increases with the ringing current.

Other demands for the flyback circuit include requirements for higher voltage output and low cost, compact design. While the high voltage requirement may be met by increasing the number of turns of the transformer's secondary winding, this is accompanied by an increase in the leakage inductance and distributed capacitance and hence a decrease in the ringing frequency. This makes it impossible to meet the requirement that the ringing current be tuned to one of the ninth, thirteenth and seventeenth harmonics of the flyback pulse and contradicts with the requirement for low cost, compact design.

SUMMARY OF THE INVENTION

The object of the present invention is therefore to eliminate the disadvantages of the prior art high DC voltage generator and provide an improved high DC voltage generator which allows an increase in the secondary coil turns of a stepup transformer without decreasing the ringing frequency.

The present invention provides a high DC voltage generator which comprises a stepup transformer including a primary winding and a secondary winding. The secondary winding has a first terminal connected through a first circuit to a high voltage terminal of the high voltage generator and a second terminal connected through a second circuit to ground. Means are connected to the primary winding for generating therein a time-varying current and inducing a high voltage pulse in the secondary winding in response to a rapid change in the time-varying current. A plurality of first diodes and a plurality of capacitors are provided which are arranged to form at least a substantial part of a voltage multiplier for multiplying the amplitude of the high voltage pulse and storing the multiplied pulse on the capacitors to develop a high DC voltage for delivery through the first circuit to the output terminal.

According to the invention, a second diode is connected in the second circuit so that a current may flow in a loop through the first and second diodes in response to a rapid change in the time-varying current and potentials of opposite polarities may develop across the first and second terminals with respect to a neutral point in the secondary winding, the second diode being arranged to be reverse-biased to form a capacitance in series with a distributed capacitance of the secondary winding. The total capacitance of the secondary winding is thus reduced, causing the ringing current to be tuned to a desired harmonic of the high voltage pulse.

Preferably, the first and second diodes and the capacitors are arranged in a symmetrical configuration with respect to the secondary winding of the transformer. This enables the neutral point to be biased to a potential substantially one-half the high DC output voltage. This neutral point potential can be used to advantage for application to the focusing electrode of a cathode ray tube.

BRIEF DESCRIPTION OF THE DRAWINGS

The present invention will be described in further detail with reference to the accompanying drawings, in which.

DETAILED DESCRIPTION

Figure 1:
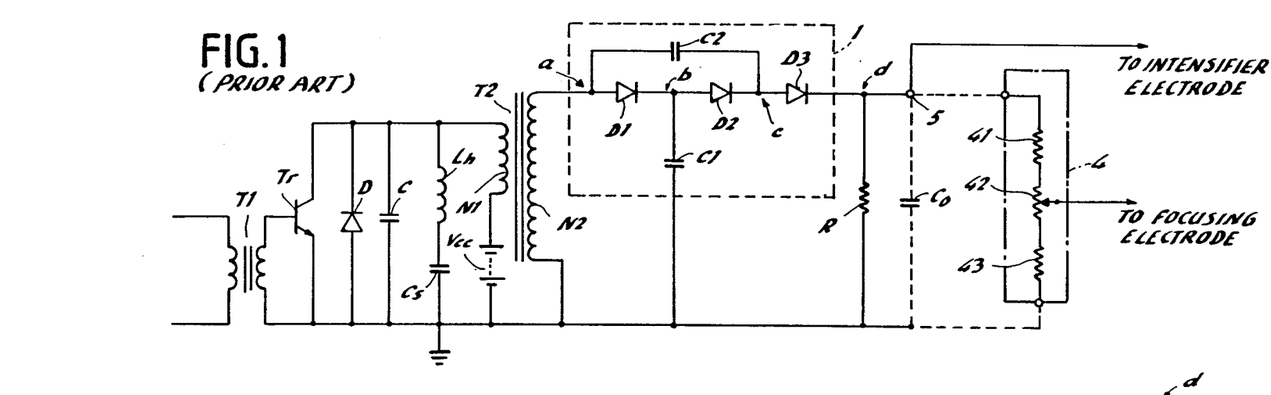
FIG. 1 is a circuit diagram of a prior art high DC voltage generator.

Before going into the detail of the present invention it is appropriate to discuss a prior art flyback circuit, or a high DC voltage generator, which is currently employed in commercially available color television receivers and illustrated in FIG. 1. Shown at Tr is a switching transistor whose base and emitter are coupled to the secondary winding of a transformer T1 to the primary winding of which is applied the horizontal sync pulse of the television receiver. The collector of transistor Tr is coupled to one end of the primary of a flyback transformer T2, the emitter thereof being coupled to ground or reference potential. The other end of the secondary winding of transformer T2 is connected to the positive pole of a battery Vcc whose negative pole is grounded. A damper diode D and a resonance capacitor C are in shunt with the collector-emitter path of the transistor Tr. The resonance capacitor C is in shunt with a series circuit comprising a horizontal deflection coil Lh and a linearity correction capacitor Cs. Across the secondary winding of transformer T2 is connected a voltage doubler 1 including diodes D1, D2 and D3 connected in series between one end of the secondary winding of T2 and an output terminal 5, a first capacitor C1 connected between the junction of diodes D1 and D2 and ground and a second capacitor C2 connected in shunt with the series combination of diodes D1 and D2. The output terminal 5 is connected to the intensifier electrode of a cathode ray tube, not shown, whose capacitance is indicated at Co. In practical applications, a resistor network 4 is connected to the high voltage output terminal 5 instead of the load resistor R. This network includes fixed value resistors 41 and 43 and a potentiometer 42 connected in series between resistors 41 and 43 to derive a DC output at the tap point of potentiometer 42 for application to the focusing electrode of the cathode ray tube.

Figure 2:
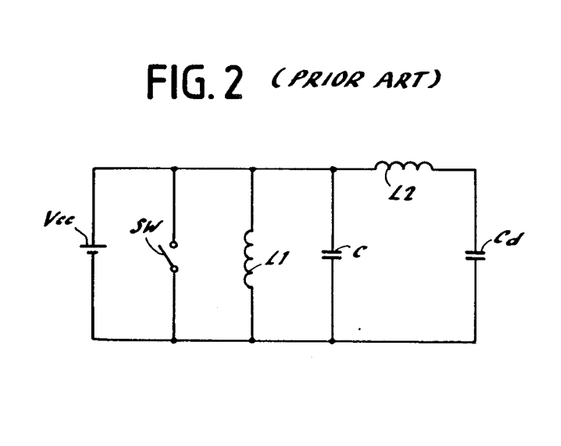
FIG. 2 is an equivalent circuit of the prior art voltage generator.

The arrangement of FIG. 1 can be represented by an equivalent circuit shown in FIG. 2 in which the transistor Tr is represented by a switch SW, the parallel combination of deflection coil Lh and the primary winding N1 of flyback transformer T2 is represented by an inductance L1, the leakage inductance between the primary winding N1 and secondary winding N2 is represented by an inductance L2, and the distributed capacitance of the secondary winding N2 is represented by a capacitance Cd. The on-off switching operation of transistor Tr in response to horizontal sync pulses causes a flyback pulse to flow through the inductance L1 and capacitance C and causes a ringing to occur at the frequency of the ninth harmonic of the flyback pulse in the inductance L2 and capacitance Cd at which the output voltage variations are advantageously small.

In response to the generation of a flyback pulse, a current flows through diode D1 and through capacitor C1 developing a voltage V1 at point b in FIG. 1 and continues through diodes D2 and D3 and through load resistor R to develop a voltage V2 across diode D2. As a result, a voltage pulse with an amplitude $(V_1+V_2)$ is developed at point a. In response to the termination of the flyback pulse, a reverse potential is developed in the secondary winding N2, whereby a current flows through capacitor C1, diode D2 and capacitor C2, driving the potential at point c between diodes D2 and D3 momentarily from $V_1$ to $(2V_1+V_2)$. A DC potential $(2V_1+V_2)$ is available at a point d.

If an attempt is made to increase the number of turns of the secondary winding N2 to obtain higher output voltage, both leakage inductance L2 and distributed capacitance Cd will increase and the ringing current will be tuned to a lower order of harmonic components. Further, the width of the flyback pulse must be stretched to permit the ringing component to be tuned to an odd-number harmonic. However, the pulse width stretching will cause the pulse height to decrease, making it difficult to obtain the desired high tension voltage.

Figure 4:
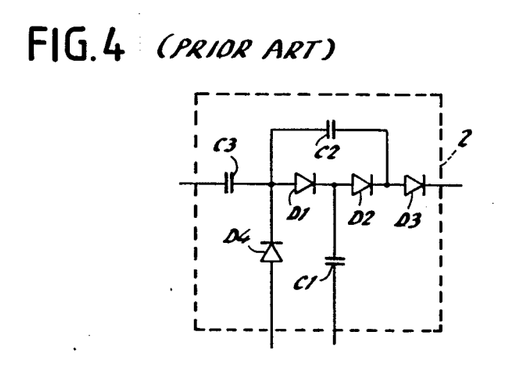
FIGS. 4 and 5 are typical examples of voltage multipliers currently used in conjunction with the circuit of FIG. 1.
Figure 5:
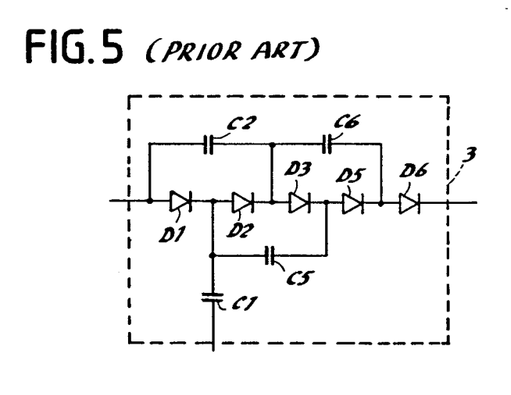

Other efforts which have hitherto been made to increase the voltage output have involved the use of a voltage doubler 2 of the type shown at FIG. 4 and a voltage tripler 3 of the type shown at FIG. 5 (both of which are known in the art) in place of the voltage doubler 1. While the voltage doubler 2 is superior in performance to the voltage doubler 1 by inclusion of additional capacitor C3 and diode D4, the use of voltage doubler 2 has shown that the voltage output has increased only by 3-to-4 percent of the voltage available with doubler 1, a value not sufficient to be paid off by the additional elements. On the other hand, the use of the voltage tripler 3 is satisfactory to meet the voltage requirement, the resultant advantage is not paid off by the increased complexity and cost incurred by the inclusion of additional capacitors C4, C5 and diodes D5, D6.

Figure 6:
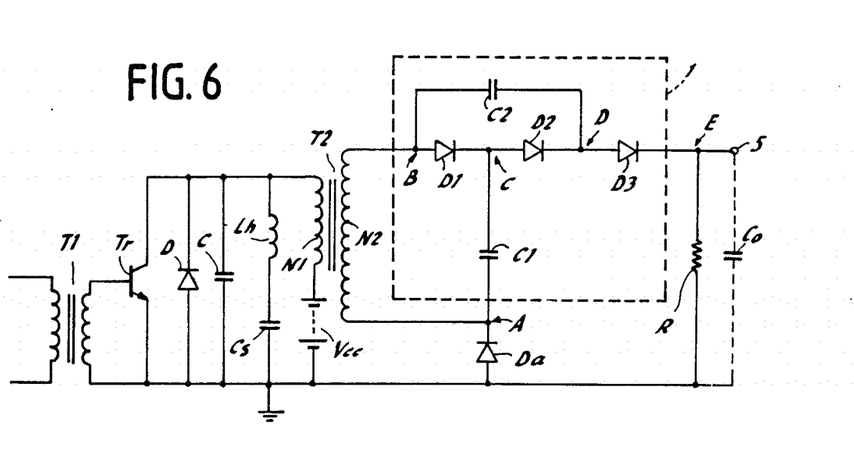
FIG. 6 is a circuit diagram of a first embodiment of the high DC voltage generator of the present invention.
Figure 7:
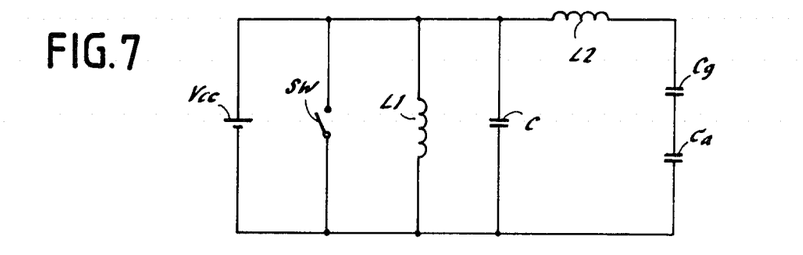
FIG. 7 is an equivalent circuit of the first embodiment.

Referring now to FIGS. 6, 9, 11 and 15, the embodiments of the present invention are illustrated. In these drawings same reference numerals are used to designate parts having identical functions. In FIG. 6, there is shown a first embodiment of the present invention which differs from FIG. 1 in that it additionally includes a diode Da having its anode coupled to the ground and its cathode coupled to the beginning of the winding of the secondary N2 of flyback transformer T2 and to the capacitor C1. The embodiment of FIG. 6 can be represented by an equivalent circuit shown in FIG. 7 which is similar to the equivalent circuit of FIG. 2 with the exception that the distributed capacitance Cd is replaced with a series combination of a capacitance Cg which represents the distributed capacitance of the secondary winding N2 with respect to ground and a small capacitance Ca which is developed in diode Da when the latter is reversely biased. As a result, the capacitance value of the ringing circuit is substantially determined by the capacitance of the diode Da, allowing the ringing frequency to increase.

Figure 8:
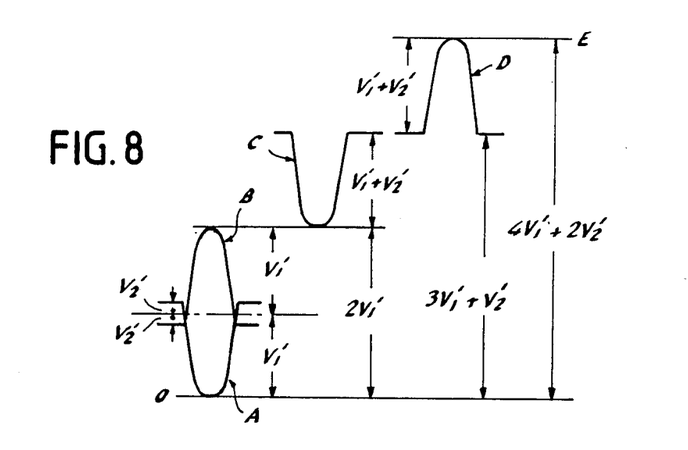
FIG. 8 is a waveform diagram associated with the FIG. 6 embodiment.

Furthermore, the diode Da serves to increase the impedance at the lower end of the secondary winding N2 with respect to ground. In response to a flyback pulse generated in the same manner as described above, pulses with potentials $V_1'$ of opposite polarities develop across opposite terminals A and B of the secondary winding with respect to a neutral point which is formed somewhere in this winding as indicated in FIG. 8. The presence of the neutral point is advantageous in that it further reduces the distributed capacitance of the secondary winding N2 with an attendant increase in the ringing frequency. Since the neutral point of the secondary winding N2 is biased to a DC voltage $V_1'$ (which is approximately equal to ½ of the voltage $V_1$ generated in the prior art flyback circuit), the flyback pulse height is reduced to ½ of the prior art which relaxes the insulation requirement of the transformer and anode C between diodes D1 and D2 rises from a potential $2V_1'$ to a level $(3V_1'+V_2')$ in response to the termination of the flyback pulse and thereafter, where $V_2'$ corresponds to a voltage developed across diode D2 and assumes ½ of the voltage $V_2$ of the prior art circuit.

A node D between the diodes D2 and D3 is maintained at a potential $(3V_1'+V_2')$ in the absence of the flyback pulse and is driven to a higher level $(4V_1'+2V_2')$ in response to a subsequent flyback pulse. The anode E at the cathode of diode D3 is held at the highest level $(4V_1'+2V_2')$.

According to a feature of the invention, the diodes D3 and Da of the invention are only required to withstand a voltage which is almost one-half the voltage required to be withstood by the diodes D1, D2 and D3 of the FIG. 1 prior art circuit and which is exactly one-half the voltage required to be withstood by the diodes D1 and D2 of the FIG. 6 circuit, while retaining the same voltage requirement as in the prior art for the capacitors C1 and C2. Therefore, the inclusion of the diode Da does not substantially affect the cost and size of the flyback circuit.

Table 1 below shows the results of comparison tests between the circuit of FIG. 6 and the prior art circuits of FIGS. 1 and 2, using the same flyback transformer having a leakage inductance of 25.7 mH. The ringing was tuned to the frequency of the ninth harmonic of the flyback pulse.

TABLE 1

Figure 3:
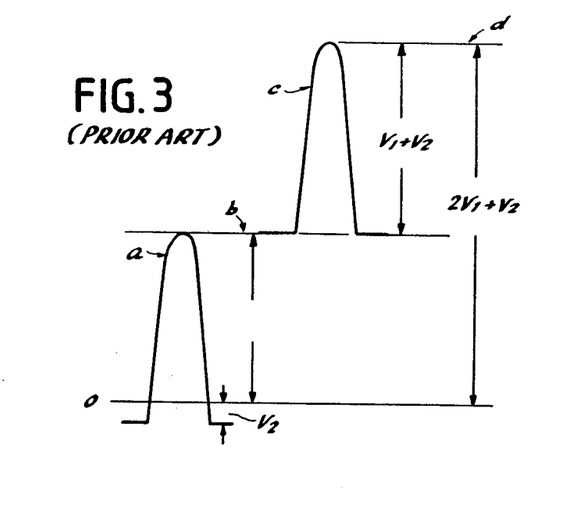
FIG. 3 is a waveform diagram associated with the prior art of FIG. 1.

|  | FIG. 1 | FIG. 2 | FIG. 3 |
| --- | --- | --- | --- |
| $Eht_0$ | 19.90 kV | 20.60 kV | 23.90 kV |
| $\Delta Eht$ | 4.59% | 5.14% | 4.18% |
| Pf | 11.4 μsec | 11.6 μsec | 9.5 μsec |
| Pr | 2.80 μsec | 2.83 μsec | 2.22 μsec |
| Cd | 7.73 pF | 7.91 pF | 4.87 pF |
| $L_1$ | 25.7 mH | 25.7 mH | 25.7 mH |

Note:
$Eht_0$: DC output for zero load current.
$\Delta Eht$: DC output voltage variation given by $\{(Eht_0 - Eht_1)/Eht_0\} \times 100$ (%), where $Eht_1$ is the DC output for a 1 mA load current.
Pf: Flyback pulse width.
Pr: Ringing period.
Cd: Distributed capacitance of winding N2.
$L_1$: Leakage inductance between N1 and N2.

According to Table 1, the high tension voltage $Eht_0$ for zero load current of the invention was 23.90 kilovolts and the output voltage variation was 4.18 percent which are favorably compared with those of the prior art circuits. This is due to the reduction of the distributed capacitance Cd to 4.87 picofarads which is accounted for by the capacitance of the reverse-biased diode Da.

Table 1 also shows that the flyback pulse width Pf and ringing period Pr of the invention are smaller than those of the prior art circuits. Since these design parameters may vary depending on the type of systems in which the flyback circuit is employed, these smaller values do not affect the usefulness of the circuit of FIG. 6 at all.

Since most of the current television receivers are designed to meet the requirement of the retrace, or flyback period being in the range between 11.0 and 12.0 microseconds, it is appropriate to adapt the flyback pulse width Pf to the current value of 11.4 microseconds. For this purpose, the flyback transformer T2 was redesigned by increasing the number of turns of the secondary winding N2. Table 2 illustrates the results of comparison tests between the flyback circuit of FIG. 6 using the redesigned flyback transformer and the flyback circuit of FIG. 1 in which the original flyback transformer and a redesigned flyback transformer are used.

TABLE 2

|  | FIG. 1 | FIG. 1 | FIG. 6 |
| --- | --- | --- | --- |
|  | Original Transformer | Redesigned Transformer | Redesigned Transformer |
| N1 | 91 turns | 75 turns | 91 turns |
| N2 | 990 turns | 990 turns | 1240 turns |
| $Eht_0$ | 19.9 kV | 24.1 kV | 24.0 kV |
| $\Delta Eht$ | 4.6% | 10.5% | 4.0% |

TABLE 2-continued

|  | FIG. 1 | FIG. 1 | FIG. 6 |
| --- | --- | --- | --- |
|  | Original Transformer | Redesigned Transformer | Redesigned Transformer |
| Pf | 11.4 μsec | 11.5 μsec | 11.6 μsec |
| Pr | 2.80 μsec | 2.82 μsec | 2.81 μsec |
| Pf/Pr | 4.07 | 4.08 | 4.12 |

Table 2 shows that the circuit of FIG. 6 meets the design requirements of most of the commercially available television receivers by increasing the secondary coil turns by a factor 1.26 of the original flyback transformer of FIG. 1 without adversely affecting the ratio Pf/Pr. If the secondary coil turns were increased without the employment of the diode Da, the ringing period Pr would increase and hence the flyback pulse width Pf would have to be increased correspondingly to maintain the ratio Pf/Pr constant, as a result of which the desired output voltage $Eht_0$ would not be obtained. For comparison purposes, the FIG. 1 circuit was redesigned so that the primary coil turns were decreased from 91 turns to 75 turns as shown in Table 2. Although the desired level of output voltage was obtained, this was achieved at the cost of a significant increase in output voltage variation. Also observed was an increase in magnetic flux density which produced an excessive amount of heat in the ferrite core of the flyback transformer.

Figure 9:
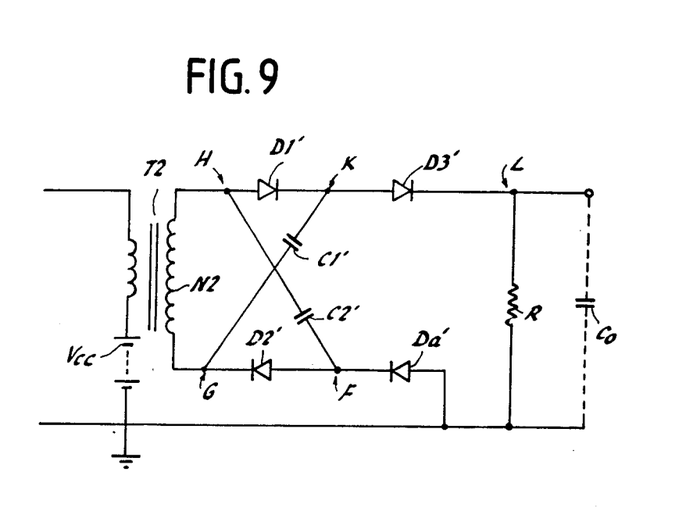
FIG. 9 is a circuit diagram of a second embodiment of the present invention.
Figure 10:
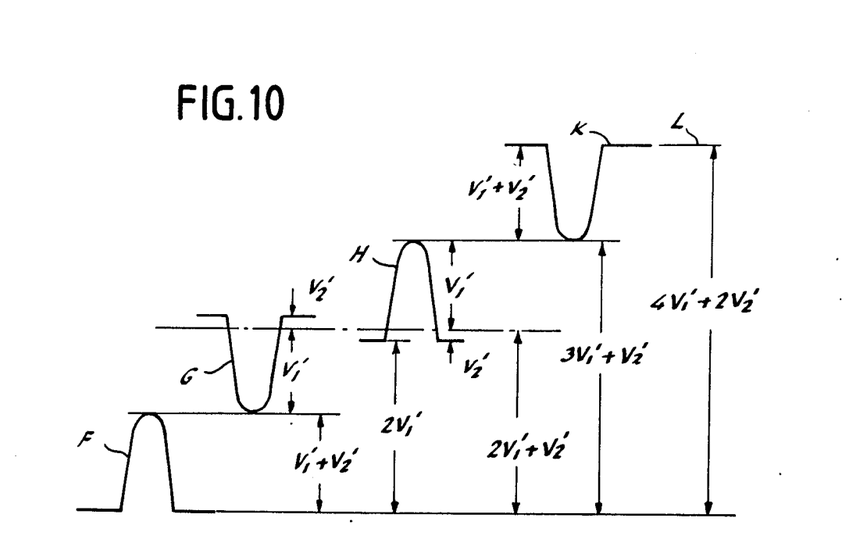
FIG. 10 is a waveform diagram associated with the FIG. 9 embodiment.

The flyback circuit of FIG. 6 can be configured into a symmetrical form as shown in FIG. 9 in which the diodes and capacitors are indicated by primed characters. More specifically, diodes D1' and D3' are connected in a series circuit to one terminal of the winding N2 and diodes D2' and Da' are connected in a series circuit to the other terminal of the winding so that the anode of diode D1' is coupled at anode H to the winding and the cathode of diode D2' is coupled to the winding at anode G. The anodes K and F in the series combinations of the diodes are cross-coupled by capacitors C1' and C2' to the anodes G and H, respectively. In response to a flyback pulse generated in a manner as described in connection with FIG. 6, diodes D1' and D2' are forward-biased through the capacitors to generate currents which flow through diodes D1' and capacitor C1' to the anode G, and through capacitor C2' and diode D1' on the other, allowing voltages $V_1$ to be stored on capacitors C1' and C2' and causing the anode F to briefly rise from ground potential to a level $(V_1'+V_2')$ as shown in FIG. 10. In response to the absence of the flyback pulse, diodes D3' and Da' are forward-biased through load resistor R and capacitors C1' and C2', whereby voltages $2V_1$ are charged on capacitors C1' and C2'. The anodes G and H are thus driven to DC levels $2(V_1'+V_2')$ and $2V_1'$, respectively. Since capacitor C1' is charged to $2V_1$, the potential at anode K and hence anodes L is driven to a DC level $(4V_1'+2V_2')$. A subsequent flyback pulse recharges the capacitors C1' and C2' in the forward direction and drives the anode G briefly downward to $(V_1'+V_2')$, drives the anode H briefly upward to $(3V_1'+V_2')$ and drives the anode K briefly downward to the same potential as at anode H.

Because of the symmetrical configuration, a neutral point is formed at the midpoint of the secondary winding N2. This neutral point is biased at a DC potential $(2V_1'+V_2')$ which is ½ the high DC voltage output $(4V_1'+2V_2')$. A further advantage of the symmetrical configuration is that it allows reduction of the voltages impressed on the capacitors to increase reliability. Low cost capacitors can thus be employed to advantage.

Figures 11, 12:
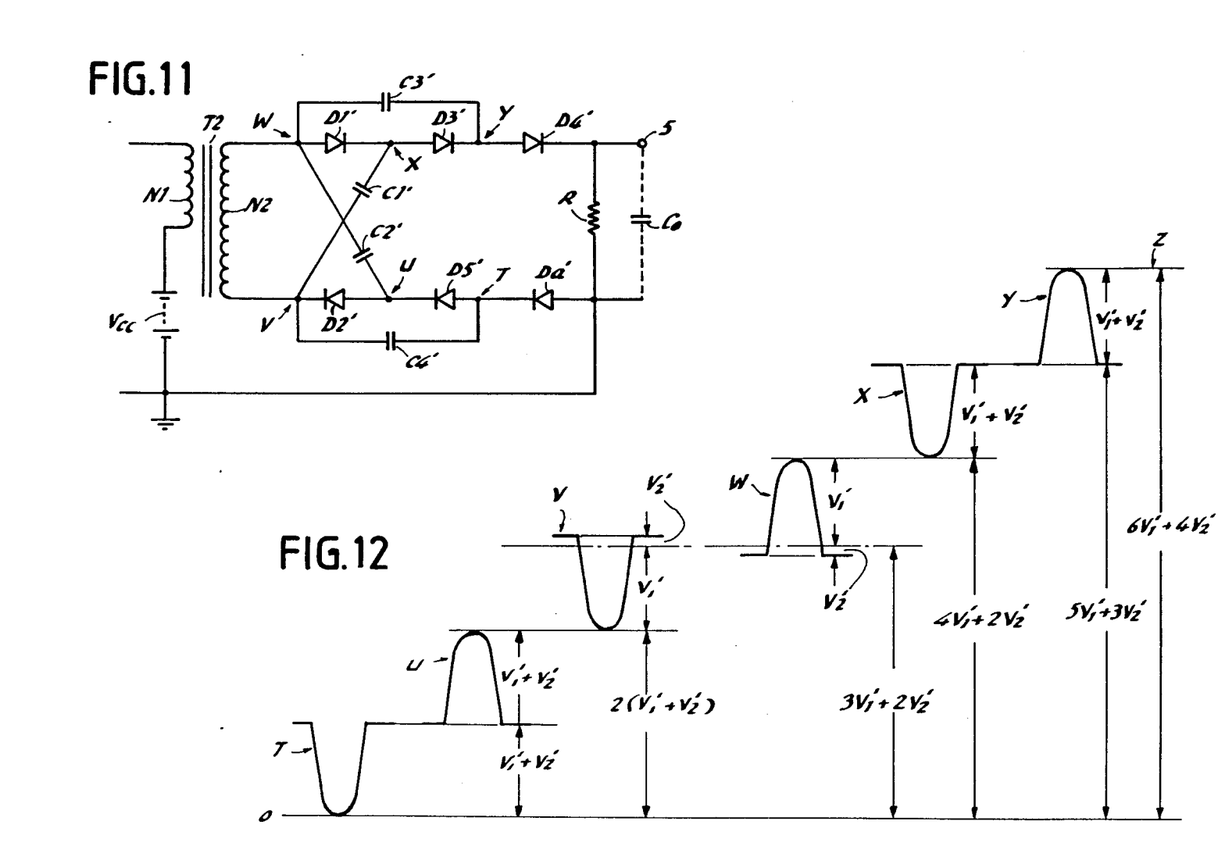
FIG. 11 is a circuit diagram of a third embodiment of the present invention.
FIG. 12 is a waveform diagram associated with the FIG. 11 embodiment.

A further embodiment of the invention is illustrated in FIG. 11 which differs from the FIG. 9 embodiment in that it additionally includes capacitors C3' and C4' which are paralleled with diodes D1', D3' and diodes D2', D5', respectively. Diode D4' is in series with and in the same direction as diodes D1' and D3', and diode D5' is connected between and in the same direction as diodes D2' and Da', the arrangement being such that the high voltage output is thrice as large as the voltage available directly from the secondary winding N2. In this embodiment, the number of secondary coil turns is 60% of that of the FIG. 4 embodiment. A further reduction in the ringing component and high voltage variation can be achieved by allowing the ringing current to occur at the frequency of the thirteenth harmonic of the flyback pulse. The various waveforms appearing at anodes T, U, V, W, X, Y and Z of this circuit are shown in FIG. 12. As is seen from FIG. 12, a neutral point is formed at the midpoint of the secondary winding N2 and which is biased at one-half the high voltage DC output as in FIG. 9.

Considering now the effect of the ringing component on the horizontal trace period which can adversely affect the operation of a video tape recorder when it is placed in proximity to the television receiver. This effect is generally measured in terms of the ringing ratio (B/A) ×100% as a function of load current, where A and B are the amplitudes of the flyback pulse and the ringing component. For purposes of comparison, the ringing ratio is measured of the apparatus of FIGS. 1, 2, 6 and 9 for load currents of zero, 0.15 mA, 1.00 mA and 1.50 mA. The results of the measurements are shown in Table 3.

TABLE 3

| Load Curr. (mA) | FIG. 1 | FIG. 2 | FIG. 6 | FIG. 9 | FIG. 9* |
|---|---|---|---|---|---|
| 0 | 8.75% | 9.50% | 9.50% | 6.25% | 2.50% |
| 0.15 | 8.75% | 3.75% | 2.25% | 2.50% | 1.00% |
| 1.00 | 3.75% | 4.50% | 1.00% | 1.00% | 1.00% |
| 1.50 | 5.00% | 6.00% | 1.00% | 1.00% | 1.00% |

*A bleeder current of 100 microamperes is drained through load resistor R to simulate actual loading conditions.

Figure 13:
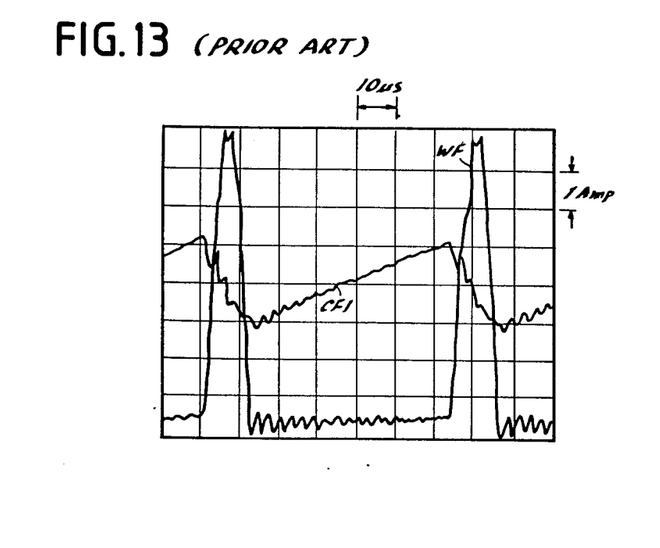
FIG. 13 is an oscilloscope analysis of the prior art of FIG. 1.
Figure 14:
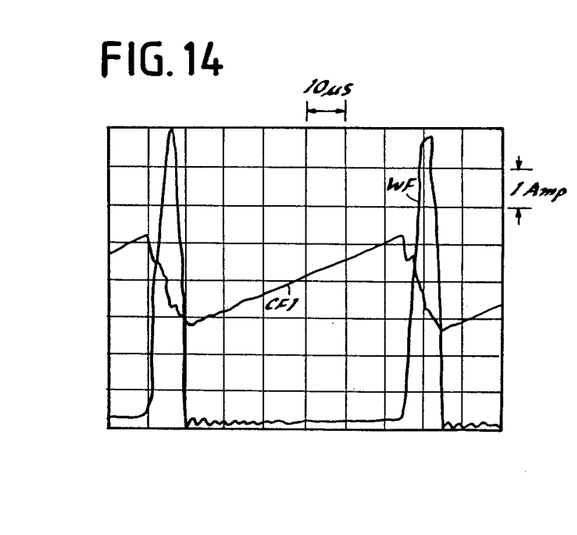
FIG. 14 is an oscilloscope analysis of the FIG. 11 embodiment.

As shown in Table 3, the prior art flyback circuits have a tendency to decrease the ringing ratio with an increase in load current until the latter reaches a point between 0.15 mA and 1.00 mA. However, they have an opposite tendency when the load current increases thereafter. On the other hand, the flyback circuits of FIGS. 6 and 9 exhibit a tendency to decrease the ringing ratio rapidly as the load current increases from zero to 0.15 mA and then the ringing ratio decreases steadily with the load current to as low as 1.00%. This significant reduction of the ringing ratio is considered to be the result of a mutual cancellation of the charging currents that are generated in response to the opposite polarity pulses at the opposite terminals of the secondary winding N2. FIG. 14 demonstrates the significant reduction of the ringing component of the circuit of FIG. 9 in comparison with that of the FIG. 1 prior art circuit which is shown in FIG. 13.

Figure 15:
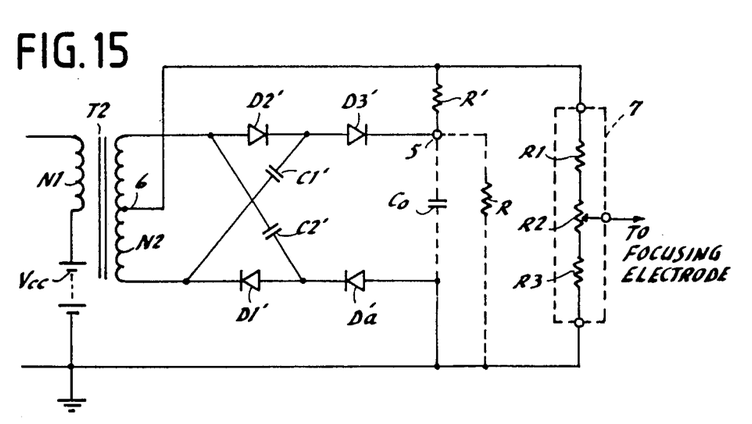
FIG. 15 is a circuit diagram of a fourth embodiment of the present invention.

Since the neutral point of the secondary winding N2 is maintained at one-half the high DC output as described with reference to the symmetrical configurations of FIGS. 9 and 11, it is of a significant benefit to utilize the DC potential of the neutral point of these embodiments to derive a lower potential for application to the focusing electrode of the cathode ray tube. This is achieved by the provision of a tapped connection 6 at the midpoint of the secondary winding N2 as illustrated in FIG. 15 in which the voltage multiplier of FIG. 9 is shown for purposes of illustration. The tap point 6 is connected to one end of a voltage dividing resistor network 7 having series-connected resistors R1, R2 and R3, the resistor R2 being a potentiometer whose tap point is connected to the focusing electrode of the cathode ray tube.

The resistor network 7 also acts as high voltage load and reduces the output voltage variation and ringing component. Another important advantage resides in the fact that since the impedance is low at the tap point of the winding N2, the total resistance value of the network 7 can be made small in comparison with the prior art circuit of FIG. 1 in which the focusing voltage is derived from the output terminal 5. This improves the focus tracking characteristic which is a plot of the ratio of focus voltage to DC high voltage as a function of load current.

Figure 17:
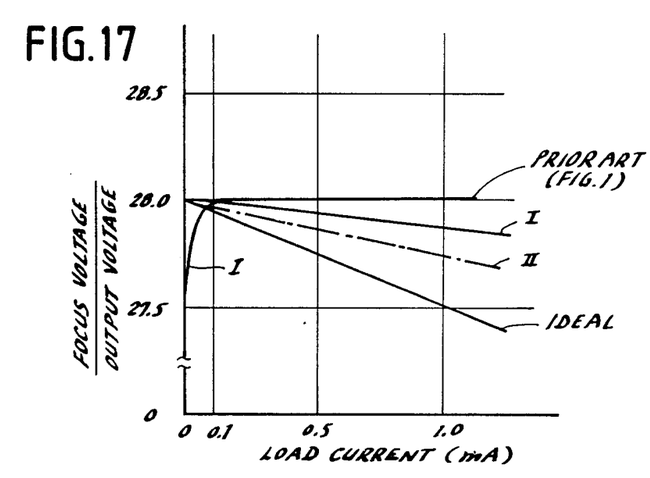
FIG. 17 is a graphic illustration of focus tracking characteristics of the FIG. 15 embodiment in comparison with the FIG. 1 prior art and the ideal characteristic.

As shown in FIG. 17, the curve I indicates the characteristic obtained by the FIG. 15 circuit which compares favorably with the curve obtained by the FIG. 1 circuit. The focus tracking is further improved as indicated by a curve II by connecting a resistor R' between the tapped connection 6 and the high voltage output terminal 5 since this resistor R' combines with network 7 to act as a limiter for suppressing voltage variations for small load currents and high amplitude ringing component. The beneficial effect of this arrangement is that resistor R' and resistor network 7 can be formed of inexpensive, low resistance elements, thus eliminating the need for an expensive bleeder resistance.

While it can be dispensed with for some applications, the bleeder resistor R is preferably provided by a dotted-line connection to the high voltage terminal to further act as a suppressor for voltage variations and ringing component.

Figure 16:
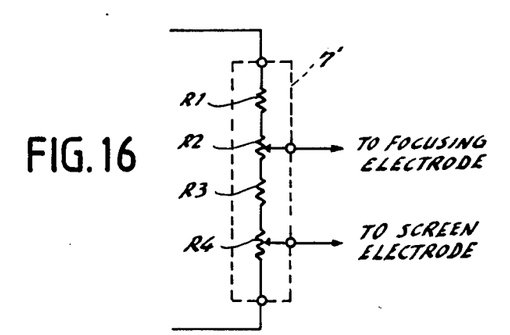
FIG. 16 is a resistor network which can be used instead of the resistor network of FIG. 15.

In addition to the focusing voltage, it is preferable to derive a screen voltage for the cathode ray tube by a resistor network 7', as shown at FIG. 16, which includes a potentiometer R4 connected in series with the resistors R1–R3.

The following is a summary of the advantages of the present invention.

(1) The formation of a neutral point in the secondary winding enables reduction of the distributed capacitance, which in turn enables the ringing current to be tuned to the frequency of a higher harmonic component of the flyback pulse and as a result the high voltage variation and the ringing component are minimized.

(2) The tuning of the ringing current to the higher harmonic frequency makes it possible to obtain a desired high DC output level by increasing the number of coil turns of the transformer's secondary winding.

(3) Due to the generation of opposite polarity voltages across the secondary winding, the amplitude of the pulse generated therein is reduced to one-half of the pulse amplitude of the prior art. This relaxes the insulation requirement of the flyback transformer and allows compact and lightweight design.

(4) By arranging diodes and capacitors of the voltage multiplier together with the diode Da in a symmetrical configuration, the neutral point is maintained at a potential which is approximately one-half the DC high output voltage and this neutral-point potential can be used to advantage by connecting a resistor network of a reduced resistance value between the neutral point and ground as a voltage supply to the focusing electrode of the cathode ray tube. Due to the small impedance of this voltage supply, the focus voltage is stabilized against drift in the high voltage which occurs as a result of aging. The focus voltage supply also serves a load on the flyback circuit as means for reducing the high voltage variations in the working range of small load currents and eliminates high amplitude ringing components.

(5) The improvement of focus tracking performance and the reduction of output voltage variations and ringing component can be achieved by the provision of a low value resistor between the neutral point and the high voltage output which would otherwise be achieved by a costly, high resistance bleeder. The focus voltage stability against high voltage drift ensures that the cathode-ray beam be sharply focused for a long period of time.

(6) The reduction of the ringing current improves the picture quality and eliminates interference with nearby electronic equipment.

What is claimed is:

1. A high DC voltage generator comprising:
   a stepup transformer including a primary winding and a secondary winding having a first terminal connected through a first circuit to a high voltage terminal of the high voltage generator and a second terminal connected through a second circuit to ground;
   means connected to said primary winding for generating therein a time-varying current and inducing a high voltage pulse in said secondary winding in response to a rapid change that occurs regularly in the time-varying current;
   a plurality of first diodes and a plurality of capacitors, said diodes and capacitors being arranged to form at least a substantial part of a voltage multiplier in said first and second circuits for multiplying the amplitude of said pulse and delivering a high DC voltage through said first circuit to said output terminal; and
   a second diode connected in said second circuit so that a current may flow in a loop through said first diodes and second diode in response to said pulse to generate potentials of opposite polarities across said first and second terminals with respect to a neutral point in said secondary winding, said second diode being arranged to be reverse-biased to form a capacitance in series with a distributed capacitance of said secondary winding,
   wherein said first and second diodes and said capacitors are connected in a symmetrical configuration with respect to said neutral point so that said neutral point is maintained at a potential which is substantially one-half the voltage delivered to said output terminal.

2. A high DC voltage generator as claimed in claim 1, wherein said transformer has a leakage inductance between said primary and secondary windings, said leakage inductance and the series combination of said capacitances form a ringing circuit which is tuned to the frequency of an odd-numbered harmonic of said pulse.

3. A high DC voltage generator as claimed in claim 1, wherein said secondary winding is provided with a third terminal at which said neutral point is substantially located, further comprising a voltage dividing resistor network having one end connected to ground and the other end connected to said third terminal, said resistor network dividing a potential developed at said third terminal for generating a potential appropriate for driving a focusing electrode of a cathode ray tube.

4. A high DC voltage generator as claimed in claim 3, wherein said resistor network further provides a voltage appropriate for driving a screen electrode of said cathode ray tube.

5. A high DC voltage generator as claimed in claim 3, further comprising a resistor connected between said third terminal and said output terminal.

6. A high DC voltage generator as claimed in claim 3, wherein said first and second diodes are equally divided into first and second groups, the diodes of the first and second groups being connected in series in said first and second circuits, respectively, to allow a current to flow in a loop through said first and second diodes in response to said pulse, said capacitors being cross-coupled between said first and second circuit so that each of said capacitors is connected from an anode of each group to an anode in the other group.

7. A high DC voltage generator as claimed in claim 6, further comprising third and fourth diodes connected in series with said first and second groups of diodes respectively and a pair of second capacitors each connected in parallel with the series-connected diodes of each group.

8. A high DC voltage generator as claimed in claim 6, further comprising a bleeding resistor connected between said output terminal and ground.

9. A flyback circuit of a television receiver comprising:
   a flyback transformer including a primary winding and a secondary winding having a first terminal connected through a first circuit to a high voltage terminal of the high voltage generator and a second terminal connected through a second circuit to ground;
   a horizontal deflection circuit having a switching transistor responsive to a horizontal synchronization pulse to generate in said primary winding a horizontal sweep current for inducing a high voltage pulse in sid secondary winding in response to a rapid change in said sweep current;
   a plurality of first diodes and a plurality of capacitors, said diodes and capacitors being arranged to form at least a substantial part of a voltage multiplier in said first and second circuits for multiplying the amplitude of said pulse and delivering a high DC voltage through said first circuit to said output terminal; and
   a second diode connected in said second circuit so that a current may flow in a loop through said first diodes and second diode in response to said pulse to generate potentials of opposite polarities across said first and second terminals with respect to a neutral point in said secondary winding, said second diode being arranged to be reverse-biased to form a capacitance in series with a distributed capacitance of said secondary winding, wherein said first and second diodes and said capacitors are connected in a symmetrical configuration with respect to said neutral point so that said neutral point is maintained at a potential which is substantially one-half the voltage delivered to said output terminal.

10. A flyback circuit as claimed in claim 9, wherein said transformer has a leakage inductance between said primary and secondary windings, said leakage inductance and the series combination of said capacitances form a ringing circuit which is tuned to the frequency of the ninth harmonic of said pulse.

11. A flyback circuit as claimed in claim 9, wherein said secondary winding is provided with a third terminal at which said neutral point is substantially located, further comprising a voltage dividing resistor network having one end connected to ground and the other end connected to said third terminal, said resistor network dividing a potential developed at said third terminal for generating a potential appropriate for driving a focusing electrode of a cathode ray tube.

12. A flyback circuit as claimed in claim 11, wherein said resistor network further provides a voltage appropriate for driving a screen electrode of said cathode ray tube.

13. A flyback circuit as claimed in claim 11, further comprising a resistor connected between said third terminal and said output terminal.

14. A flyback circuit as claimed in claim 11, wherein said first and second diodes are equally divided into first and second groups, the diodes of the first and second groups being connected in series in said first and second circuits, respectively, to allow a current to flow in a loop through said first and second diodes in response to said pulse, said capacitors being cross-coupled between said first and second circuit so that each of said capacitors in connected from an anode of each group to an anode in the other group.

15. A flyback circuit as claimed in claim 14, further comprising third and fourth diodes connected in series with said first and second groups of diodes respectively and a pair of second capacitors each connected in parallel with the series-connected diodes of each group.

16. A flyback circuit as claimed in claim 14, further comprising a bleeding resistor connected between said output terminal and ground.

17. A high DC voltage generator comprising:
a stepup transformer including a primary winding and a secondary winding having a first terminal connected through a first circuit to a high voltage terminal of the high voltage generator and a second terminal connected through a second circuit to ground;
means connected to said primary winding for generating therein a time-varying current and inducing a high voltage pulse in said secondary winding in response to a rapid change that occurs regularly in the time-varying current;
first, second and third diodes connected in series in said first circuit and a plurality of capacitors, said diodes and capacitors being arranged to form at least a substantial part of a voltage multiplier in said first and second circuits for multiplying the amplitude of said pulse by a factor of four and delivering a high DC voltage through said first circuit to said output terminal; and
a fourth diode connected in said second circuit so that a current may flow in a loop through said first, second, third and fourth diodes in response to said pulse to generate potentials of opposite polarities across said first and second terminals with respect to a neutral point in said secondary winding, said fourth diode being arranged to be reverse-biased to form a capacitance in series with a distributed capacitance of said secondary winding, wherein one of said capacitors being connected between said fourth diode and a junction between said first and second diodes, and another of said capacitors being connected in parallel with the series-connected first and second diodes.

18. A high DC voltage generator as claimed in claim 1, wherein said transformer has a leakage inductance between said primary and secondary windings, said leakage inductance and the series combination of said capacitances form a ringing circuit tuned to the frequency of an odd-numbered harmonic of said pulse.

19. A flyback circuit of a television receiver comprising:
a flyback transformer including a primary winding and a secondary winding having a first terminal connected through a first circuit to a high voltage terminal of the high voltage generator and a second terminal connected through a second circuit to ground;
a horizontal deflection circuit having a switching transistor responsive to a horizontal synchronization pulse to generate in said primary winding a horizontal sweep current for inducing a high voltage pulse in said secondary winding in response to a rapid change in said sweep current;
first, second and third diodes and a plurality of capacitors, said diodes and capacitors being arranged to form at least a substantial part of a voltage multiplier in said first and second circuits for multiplying the amplitude of said pulse by a factor of four and delivering a high DC voltage through said first circuit to said output terminal;
a fourth diode connected in said second circuit so that a current may flow in a loop through said first, second, third and fourth diodes in response to said pulse to generate potentials of opposite polarities across said first and second terminals with respect to a neutral point in said secondary winding, said fourth diode being arranged to be reverse-biased to form a capacitance in series with a distributed capacitance of said secondary winding, wherein one of said capacitors being connected between said fourth diode and a junction between said first and second diodes, and another of said capacitors being connected in parallel with said series-connected first and second diodes.

20. A flyback circuit as claimed in claim 19, wherein said transformer has a leakage inductance between said primary and secondary windings, said leakage inductance and the series combination of said capacitances form a ringing circuit tuned to the frequency of the ninth harmonic of said pulse.

* * * * *